Oct. 19, 1926.  
J. RIDLINGTON  
1,603,410  
SUPPORT FOR VEHICLE HEADLAMPS  
Filed Jan. 29, 1926  2 Sheets-Sheet 1

INVENTOR  
Joseph Ridlington.  
BY  
ATTORNEY

Oct. 19, 1926. 1,603,410
J. RIDLINGTON
SUPPORT FOR VEHICLE HEADLAMPS
Filed Jan. 29, 1926   2 Sheets-Sheet 2
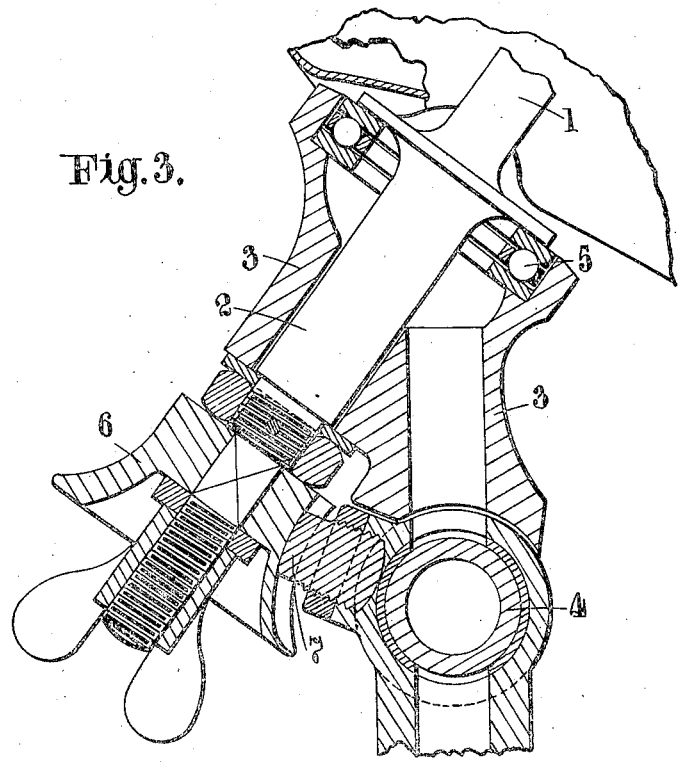
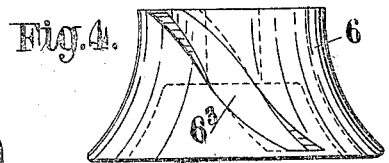
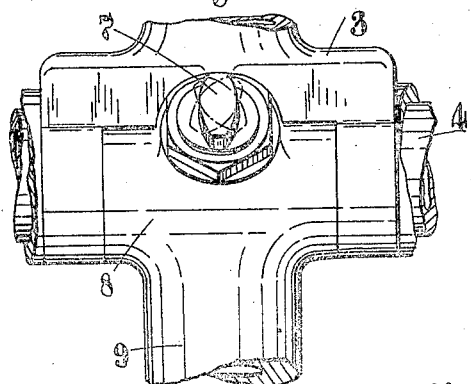
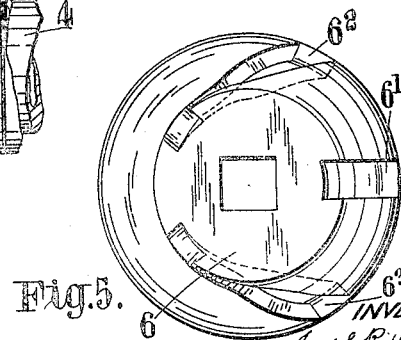
INVENTOR
Joseph Ridlington
BY
Robert G. Phillips
ATTORNEY Patented Oct. 19, 1926.

1,603,410

UNITED STATES PATENT OFFICE.

JOSEPH RIDLINGTON, OF ACTON, LONDON, ENGLAND, ASSIGNOR TO BARKER & COMPANY (COACHBUILDERS) LIMITED, OF LONDON, ENGLAND, A CORPORATION OF GREAT BRITAIN AND IRELAND.

SUPPORT FOR VEHICLE HEADLAMPS.

Application filed January 29, 1926, Serial No. 84,741, and in Great Britain December 5, 1924.

My invention relates to supports for the head lamps of road vehicles and particularly to such devices which enable the beams of light to be deflected both downwards and sideways with the object of removing the glare from the vision of the occupants of oncoming vehicles; and the objects of my improvement are first, to impart the desired movements to the lamps by a single positive action; second, to enable the side to which the beam of light is to be deflected to be readily reversed; and third, to enable the beam of light from one of a pair of lamps to be deflected sideways at the same time that it is deflected downwards while the beam of light from the other lamp is only deflected downwards.

I attain these ends by the mechanism illustrated in the accompanying drawing in which:—

Figure 1:
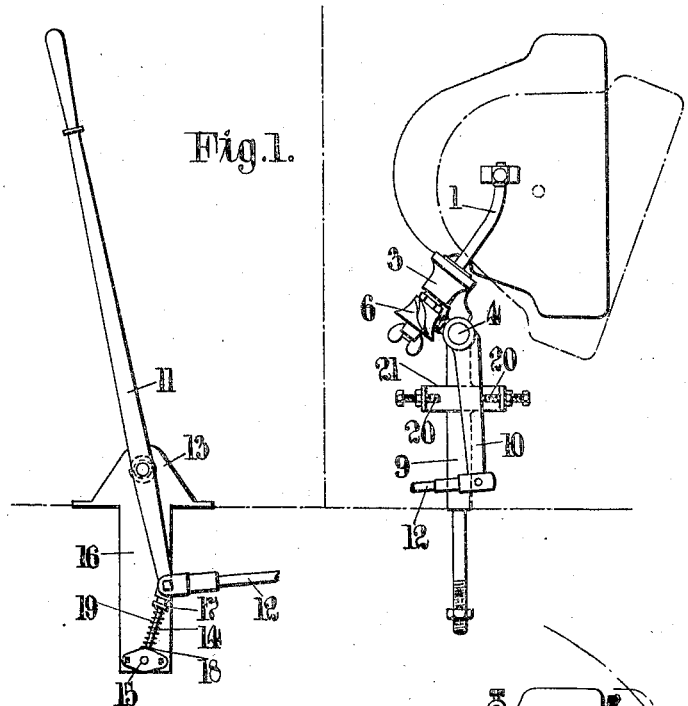
Figure 2:
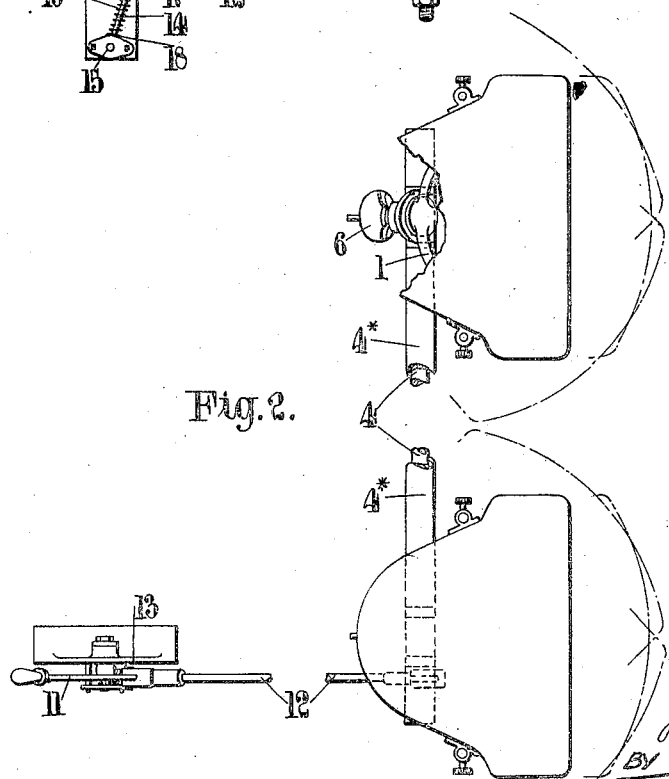

Figures 1 and 2 are broken views in side elevation and plan respectively of the complete apparatus, Fig. 3 is a view in sectional elevation—on an enlarged scale—showing the construction of the preferred form of universal joint, Figures 4 and 5 are views in elevation and plan of the controlling cam of said joint, and Figure 6 is a broken view showing the construction and arrangement of the boss which engages the cam.

Throughout the views similar parts are marked with like numerals of reference.

The brackets 1 for carrying the lamps have each a stem 2 which is mounted to swivel in a socket 3, said socket being surmounted on a transversely arranged shaft 4, mounted in bearings 8 carried by a pillar 9 which is mounted on the underframe of the vehicle. A ball bearing 5 is interposed between the stem 2 and the socket 3 to take the weight of the lamp. To stiffen the pillars 9 a hollow cross member 4* extending between said pillars enclosing the shaft 4 may be employed. On the lower end of each of the stems 2 is mounted a grooved cam 6 with which a boss 7 on the bearing 8 of the pillar 9 engages. The cams 6 each have three grooves 6¹, 6² and 6³ the former being radially arranged and the other two angularly arranged in opposite directions, and said cams are so mounted on the stems 2 that their position relative thereto can be varied to bring one or other of the grooves into engagement with the boss 7. This boss may be either of circular form in which case it need not be adjustable, or of elongated form as shown in Figure 6 in which case provision is made for its angular adjustment to enable it to register with and engage the desired groove in the cam.

By the use of these three grooves either both lamps can be caused to move so as to throw their beams of light towards one or the other side of the road, to suit the rule of the road in the particular country in which the vehicle is being used, at the same time that said beams are deflected downwards; or one of the lamps can be caused to move so as to throw its beam of light to one side of the road while the other lamp is caused to move so as to throw its beam of light to the other side of the road; or one of the lamps can be caused to move so as to throw its beam of light to one side of the road at the same time that it is thrown downwards while the other lamp is simply caused to throw its beam of light in a downward direction.

Motion is imparted to the rocking shaft 4 by means of an arm 10 fixed to it and coupled with a hand operating lever 11 pivoted to a suitable bracket 13 mounted on the underframe of the vehicle adjacent to the driver's seat, by means of a rod or link 12. Pivoted to the lower end of the hand lever 11 at its point of connection to the rod or link 12 is a rod 14 which is adapted to slide through a rocking pin 15 mounted in an extension 16 of the bracket 13, the position of the axis of said pin being in such relation to the axis of the pivot of the hand lever 11 that the lower end of said lever moves a like, or approximately like, distance on each side of the axis of said pin. Interposed between a shoulder 17 on the rod 14 and a collar 18 loosely mounted on said rod and abutting against the rocking pin 15 is a coiled or helical spring 19 which, owing to the position of the axis of the rocking pin 15 in relation to the point of pivot of the hand lever operates to keep said hand lever in either its forward or aft position the pressure thus created re-acting through the rod or link 12 to keep the shaft 4 and therefore the lamps carried by it in either their normal or their dipped positions. In order to limit the movement of the lamps and define their positions both when in their normal and dipped positions adjustable stops 20 are provided to limit the movement of the arm 10 and therefore of the shaft 4, said stops being carried by a forked bracket 21 formed on or carried by the adjacent pillar 9. These adjustable stops function not only as adjustable stops to limit the movement of the arm 10 in either direction but also to cause the pressure of the spring 19 operating through the rod or link 12 to react on the bearings in which the shaft 4 is mounted by reason of one or other of said stops operating as an intermediate fulcrum to the arm 10.

I claim:—

1. A mounting for head lamps of road vehicles, comprising a bracket adapted to carry the lamp, a stem on said bracket, a rocking shaft carried by the underframe of the vehicle, a socket mounted on said shaft so as to rock with it in which the stem of the bracket carrying the lamp swivels, a grooved cam adjustably mounted on said stem having three grooves two of which are angularly arranged at opposite angles and the third of which is arranged axially, a fixed pin carried by the bearing of the rocking shaft with which either of the grooves of said cam can be selectively engaged, and means for rocking said shaft by a single movement in one direction.

2. A mounting for head lamps of road vehicles, comprising a bracket adapted to carry the lamp, a stem carried by said bracket, a rocking shaft carried by the underframe of the vehicle, a socket in which the stem of the bracket carrying the lamp swivels said socket being mounted on the rocking shaft, a triple grooved cam adjustably mounted on said stem one of the grooves being axially arranged relative to the path of movement of the cam and the other two angularly arranged in opposite directions relative to the axis of the cam, a pin carried by the bearing of the rocking shaft which engages with one of the grooves of said cam, and means for rocking said shaft by a single movement in one direction.

3. A mounting for head lamps of road vehicles, comprising a bracket adapted to carry the lamp, a stem on said bracket, a rocking shaft carried by the underframe of the vehicle, a socket mounted on said shaft, in which the stem of the lamp bracket is mounted to swivel, a cone-shaped cam adjustably mounted on said stem and having three grooves, two of which are angularly arranged in opposed directions and the other of which is axially arranged and is located between the other two grooves, and a pin carried by the bearing of the rocking shaft with which one of the grooves of the cam engages.

4. The combination with a vehicle of a plurality of head lamps, a support for each lamp comprising a bracket having a stem, a rocking shaft mounted in bearings carried by the underframe of the vehicle, sockets pivotally mounted on said shaft in which the stems of the lamp supports are mounted to swivel, cams adjustably mounted on said stems and adapted to operate between said stems and the bearings of said shaft, an arm fixed to said shaft, a hand lever pivoted to a bracket mounted on the underframe of the vehicle, a link coupling said hand lever to the arm on the rocking shaft, and a spring device which operates to maintain said hand lever in either of its extreme positions.

5. A mounting for the head lamps of road vehicles comprising a bracket adapted to carry each lamp, a stem on said bracket, a rocking shaft mounted in bearings carried by the underframe of the vehicle, sockets pivotally mounted on said shaft in which each of said stems is arranged to swivel, cams mounted on said swivelling stems and coacting with the bearings of said shaft, an arm fixed to said shaft, adjustable stops with which said arm engages for defining and limiting the movement of the lamps, a hand lever pivoted to a bracket mounted on the underframe, a link coupling said hand lever to the arm on the rocking shaft, a spring acting on the pivotal connection between the hand lever and its link which operates to maintain the arm in contact with one or other of said stops.

6. A mounting for the head lamps of road vehicles comprising a bracket adapted to carry each lamp a stem on said bracket, a rocking shaft mounted in bearings carried by the under frame of the vehicle, sockets pivotally mounted on said shaft in which each of said stems is arranged to swivel, a disc mounted on each of said swivelling stems and having three grooves, one radially arranged and the other two angularly arranged in opposite directions, a pin carried by one of the bearings of said shaft, an arm fixed to said shaft, adjustable stops with which said arm engages for defining and limiting the movement of the lamps, a hand lever pivoted to a bracket mounted on the underframe, a link coupling said hand lever to the arm on the rocking shaft, a spring acting on the pivotal connection between the hand lever and its link which operates to maintain the arm in contact with one or other of said stops.

JOSEPH RIDLINGTON.